(12) United States Patent
Jaroschek

(10) Patent No.: US 9,559,439 B2
(45) Date of Patent: Jan. 31, 2017

(54) ELECTRICAL CONNECTOR FOR END TO END CONNECTION

(71) Applicant: Tyco Electronics Raychem GmbH, Ottobrunn (DE)

(72) Inventor: Jens Jaroschek, Lenggries (DE)

(73) Assignee: Tyco Electronics Raychem GmbH, Ottobrunn (DE)

( * ) Notice: Subject to any disclaimer, the term of this patent is extended or adjusted under 35 U.S.C. 154(b) by 0 days.

(21) Appl. No.: 14/864,250

(22) Filed: Sep. 24, 2015

(65) Prior Publication Data

US 2016/0087352 A1 Mar. 24, 2016

(30) Foreign Application Priority Data

Sep. 24, 2014 (EP) .................................. 14186132

(51) Int. Cl.
*H01R 4/36* (2006.01)
*H02G 15/113* (2006.01)
*H02G 15/184* (2006.01)
*H01R 4/70* (2006.01)
*H01R 13/447* (2006.01)
*H01R 13/52* (2006.01)

(52) U.S. Cl.
CPC ........... *H01R 4/36* (2013.01); *H01R 4/70* (2013.01); *H01R 13/447* (2013.01); *H01R 13/5213* (2013.01); *H02G 15/113* (2013.01); *H02G 15/184* (2013.01)

(58) Field of Classification Search
CPC .......................................................... H01R 4/36
USPC ................. 174/84 R, 85, 86, 87, 88 R, 88 B, 88 C, 174/88 S, 89, 90, 91, 92, 93, 94 R, 94 S, 84 C, 174/84 S, 75 R, 73.1
See application file for complete search history.

(56) References Cited

U.S. PATENT DOCUMENTS

| | | | | |
|---|---|---|---|---|
| 1,642,345 A | * | 9/1927 | Telford | H01R 4/363 403/306 |
| 2,901,725 A | * | 8/1959 | Schuyler | H01R 4/32 174/84 S |
| 2,967,899 A | * | 1/1961 | Priaroggia | H02G 15/24 174/20 |
| 3,104,275 A | * | 9/1963 | Palmieri | H02G 15/103 174/73.1 |
| 3,281,524 A | * | 10/1966 | Lynch, Jr | H01R 4/20 174/84 C |
| 3,485,935 A | * | 12/1969 | Kreuger | H02G 15/103 174/21 R |
| 3,499,100 A | * | 3/1970 | O'Mara | H02G 15/184 174/22 R |

(Continued)

FOREIGN PATENT DOCUMENTS

| | | |
|---|---|---|
| DE | 3142191 A1 | 5/1983 |
| GB | 2294597 A | 5/1996 |

(Continued)

OTHER PUBLICATIONS

European Search Report, Application No. 14186132.8, dated Apr. 28, 2015, 8 pages.

(Continued)

*Primary Examiner* — Ross Gushi
(74) *Attorney, Agent, or Firm* — Barley Snyder

(57) ABSTRACT

An electrical connector is provided and includes a cover member and a connector bushing. The connector bushing is partially encased and movable in the cover member and having an electrical conductor section.

15 Claims, 13 Drawing Sheets

(56) References Cited

U.S. PATENT DOCUMENTS

| | | | | |
|---|---|---|---|---|
| 3,509,518 A * | 4/1970 | Phillips | H01R 4/4863 | 174/70 R |
| 3,571,783 A * | 3/1971 | Lusk | H01R 31/00 | 174/21 R |
| 3,580,986 A * | 5/1971 | Misare | H02G 15/085 | 174/73.1 |
| 3,612,746 A * | 10/1971 | Sankey | H02G 15/184 | 156/49 |
| 3,656,084 A * | 4/1972 | Malia | H02G 15/103 | 439/521 |
| 3,673,311 A * | 6/1972 | Misare | H02G 15/184 | 174/73.1 |
| 3,692,922 A * | 9/1972 | Sugimoto | H02G 15/184 | 174/73.1 |
| 3,717,717 A * | 2/1973 | Cunningham | H02G 15/103 | 156/49 |
| 3,816,639 A * | 6/1974 | Anderson | H02G 15/003 | 156/49 |
| 3,816,640 A * | 6/1974 | Varner | H02G 15/184 | 156/49 |
| 3,828,114 A * | 8/1974 | Priaroggia | H02G 15/068 | 174/142 |
| 3,829,600 A * | 8/1974 | Portinari | H02G 15/184 | 174/73.1 |
| 3,842,187 A * | 10/1974 | Barkan | H01R 35/00 | 174/13 |
| 3,864,013 A * | 2/1975 | Levy | H01R 4/36 | 174/84 C |
| RE28,877 E * | 6/1976 | Pertuit | H01R 4/36 | 439/723 |
| 3,992,567 A * | 11/1976 | Malia | H02G 15/103 | 174/73.1 |
| 3,996,081 A * | 12/1976 | Nakata | H02G 15/003 | 156/48 |
| 4,006,288 A * | 2/1977 | Stevens | H02G 15/10 | 174/73.1 |
| 4,034,151 A * | 7/1977 | Silva | H02G 15/10 | 174/73.1 |
| 4,054,743 A * | 10/1977 | Mayer | H02G 15/10 | 174/10 |
| 4,056,680 A * | 11/1977 | Aihara | H02G 15/06 | 156/48 |
| 4,099,021 A * | 7/1978 | Venezia | H02G 15/10 | 174/73.1 |
| 4,103,984 A * | 8/1978 | Mixon, Jr. | H01R 4/24 | 439/415 |
| 4,192,964 A * | 3/1980 | Sacks | H02G 15/10 | 174/73.1 |
| 4,238,639 A * | 12/1980 | Palmieri | H02G 15/103 | 174/73.1 |
| 4,241,004 A * | 12/1980 | Hervig | H02G 15/103 | 264/261 |
| 4,269,465 A * | 5/1981 | Mueller | H01R 4/36 | 439/431 |
| 4,383,131 A * | 5/1983 | Clabburn | H02G 15/10 | 156/49 |
| 4,388,523 A * | 6/1983 | Keep, Jr. | H05B 3/06 | 174/77 R |
| 4,424,410 A * | 1/1984 | Edgerton | H02G 15/103 | 174/73.1 |
| 4,485,269 A * | 11/1984 | Steinberg | H02G 15/10 | 156/49 |
| 4,698,458 A * | 10/1987 | Parmigiani | H02G 15/184 | 174/73.1 |
| 4,795,365 A * | 1/1989 | Johnston | H01R 4/2491 | 439/411 |
| 4,839,470 A * | 6/1989 | Ventura | H01R 4/20 | 156/49 |
| 5,000,705 A * | 3/1991 | Kinka | H01R 4/5091 | 439/791 |
| 5,087,492 A * | 2/1992 | Vallauri | H02G 15/1833 | 174/73.1 |
| 5,137,476 A * | 8/1992 | Noble | H01R 4/36 | 439/793 |
| 5,201,914 A * | 4/1993 | Hollick | H01R 4/36 | 439/801 |
| 5,422,438 A * | 6/1995 | Lamome | H01R 4/203 | 174/76 |
| 5,486,388 A * | 1/1996 | Portas | F16G 11/00 | 138/129 |
| 5,492,740 A * | 2/1996 | Vallauri | B29C 61/065 | 174/73.1 |
| 5,606,149 A * | 2/1997 | Yaworski | H02G 15/184 | 174/84 R |
| 5,630,735 A * | 5/1997 | Eckert | H01R 4/30 | 439/721 |
| 5,630,737 A * | 5/1997 | Dupont | H01R 4/26 | 439/431 |
| 5,654,526 A * | 8/1997 | Sharp | H02G 3/06 | 174/84 R |
| 5,704,809 A * | 1/1998 | Davis | H01R 13/434 | 439/349 |
| 5,804,767 A * | 9/1998 | Winfield | H02G 15/013 | 174/74 R |
| 5,821,463 A * | 10/1998 | Ngo | H01R 4/36 | 174/84 C |
| 5,875,547 A * | 3/1999 | Larsson | H01R 4/70 | 156/49 |
| 5,941,482 A * | 8/1999 | Santagata | E01B 7/24 | 219/541 |
| 5,985,062 A * | 11/1999 | Vallauri | H02G 15/1826 | 156/51 |
| 6,042,430 A * | 3/2000 | Hollick | F16B 31/021 | 411/309 |
| 6,105,247 A * | 8/2000 | Varreng | H02G 15/10 | 29/868 |
| 6,125,534 A * | 10/2000 | Varreng | H01R 4/70 | 174/71 R |
| 6,147,308 A * | 11/2000 | Santagata | E01B 7/24 | 174/75 R |
| 6,281,442 B1 * | 8/2001 | Guzowski | H02G 15/184 | 174/73.1 |
| 6,495,757 B2 * | 12/2002 | Van Boxstael | H01R 4/36 | 174/88 R |
| 6,787,703 B2 * | 9/2004 | Niinobe | H02G 15/184 | 174/135 |
| 6,916,193 B2 * | 7/2005 | Varreng | H01R 13/523 | 439/201 |
| 6,997,758 B2 * | 2/2006 | De Buyst | H01R 4/36 | 174/88 R |
| 7,394,022 B2 * | 7/2008 | Gumley | H01R 4/206 | 174/84 C |
| 7,683,260 B2 * | 3/2010 | Bertini | H01R 13/5216 | 174/84 C |
| 7,786,383 B2 * | 8/2010 | Gumley | H01R 4/206 | 174/84 C |
| 7,862,392 B1 * | 1/2011 | Chen | H01R 4/20 | 174/84 C |
| 7,901,243 B1 * | 3/2011 | Yaworski | H01R 4/34 | 439/523 |
| 7,999,182 B2 * | 8/2011 | Lallouet | H01R 4/36 | 174/125.1 |
| 8,097,807 B2 * | 1/2012 | Aue | H02G 15/188 | 174/84 R |
| 8,134,071 B2 * | 3/2012 | Aue | H02G 15/103 | 174/88 R |
| 8,202,131 B2 * | 6/2012 | Battle | H01R 4/36 | 439/796 |
| 8,267,730 B2 * | 9/2012 | Stauch | H01R 4/307 | 411/383 |
| 8,550,842 B1 * | 10/2013 | Gutierrez | H01R 4/36 | 174/74 R |
| 8,981,224 B2 * | 3/2015 | Kehl | H01R 4/70 | 174/84 R |
| 8,987,595 B2 * | 3/2015 | Bumgarner | H01R 4/363 | 174/84 R |
| 9,178,289 B2 * | 11/2015 | Seraj | H01R 4/70 | |
| 9,203,191 B2 * | 12/2015 | Bogart | H01R 13/213 | |

(56) References Cited

U.S. PATENT DOCUMENTS

| | | | |
|---|---|---|---|
| 9,240,649 B2* | 1/2016 | Battle | H01R 13/621 |
| 9,270,031 B2* | 2/2016 | Portas | H02G 15/064 |
| 2003/0127242 A1* | 7/2003 | Pilling | H02G 15/184 |
| | | | 174/138 R |
| 2009/0218135 A1* | 9/2009 | Vallauri | H02G 15/1826 |
| | | | 174/88 C |
| 2010/0279542 A1* | 11/2010 | Seraj | H01R 4/72 |
| | | | 439/502 |
| 2011/0092112 A1* | 4/2011 | Battle | H01R 4/36 |
| | | | 439/814 |
| 2012/0276789 A1* | 11/2012 | Battle | H01R 4/36 |
| | | | 439/797 |
| 2013/0056268 A1* | 3/2013 | Bumgarner | H01R 4/363 |
| | | | 174/94 R |
| 2014/0000110 A1* | 1/2014 | Stauch | H02G 15/08 |
| | | | 29/869 |
| 2015/0162737 A1* | 6/2015 | Newman | H02G 1/14 |
| | | | 174/91 |
| 2015/0207245 A1* | 7/2015 | Emerson | H01R 4/70 |
| | | | 174/93 |
| 2016/0079723 A1* | 3/2016 | Bogart | H01R 13/213 |
| | | | 29/876 |
| 2016/0087352 A1* | 3/2016 | Jaroschek | H01R 4/36 |
| | | | 439/801 |

FOREIGN PATENT DOCUMENTS

| | | |
|---|---|---|
| JP | 52101994 U | 8/1977 |
| WO | 2014095563 A1 | 6/2014 |

OTHER PUBLICATIONS

Abstract of DE 3142191, dated May 11, 1983, 1 page.
Abstract of WO 2014/095563, dated Jun. 26, 2014, 1 page.

* cited by examiner

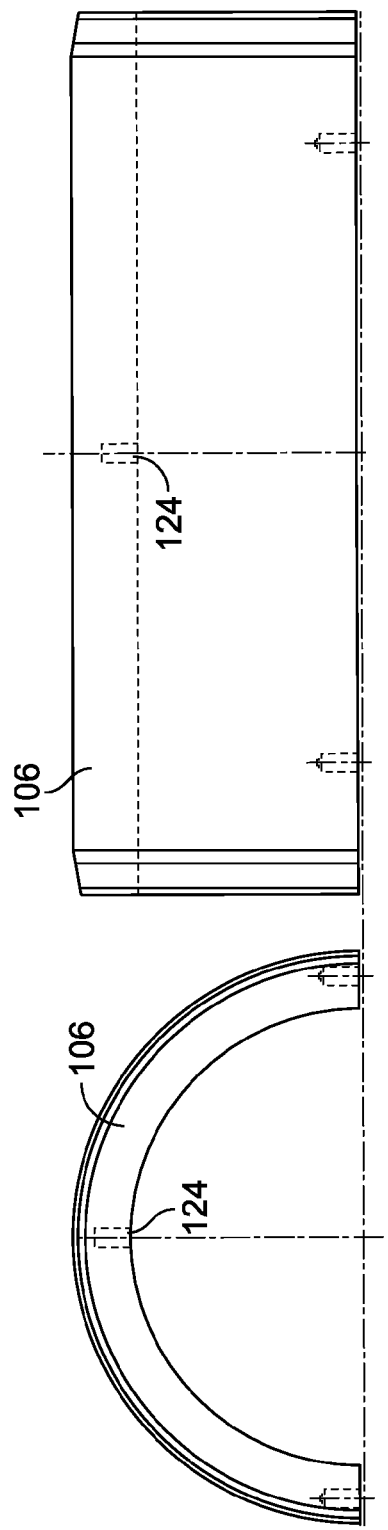

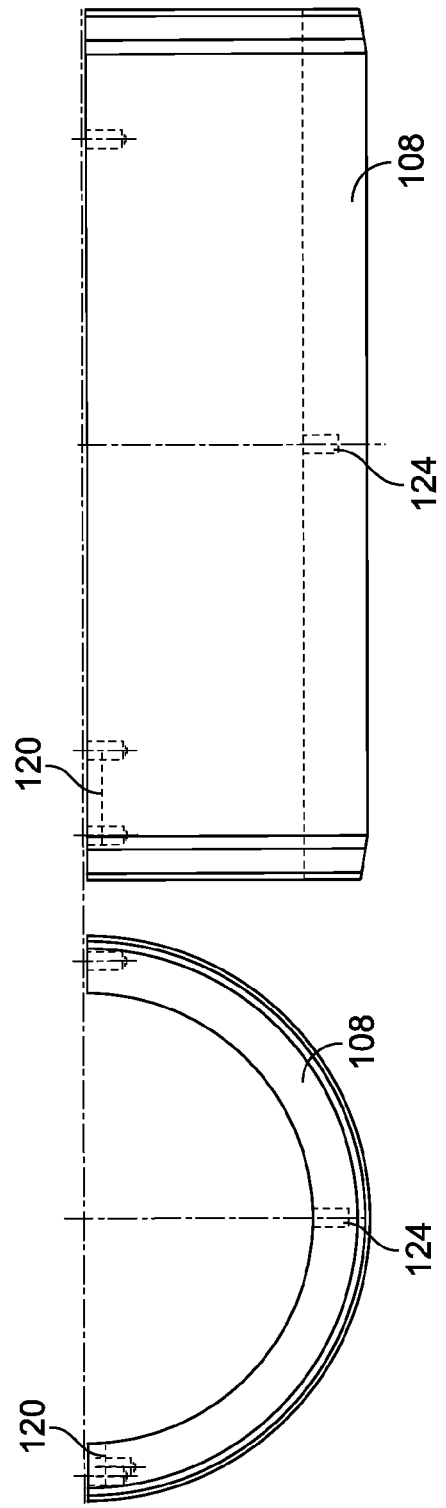

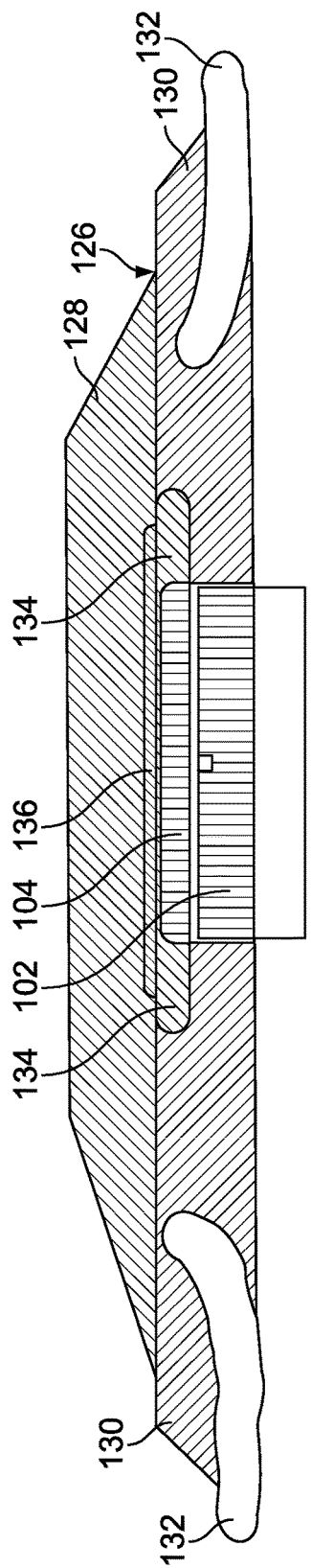
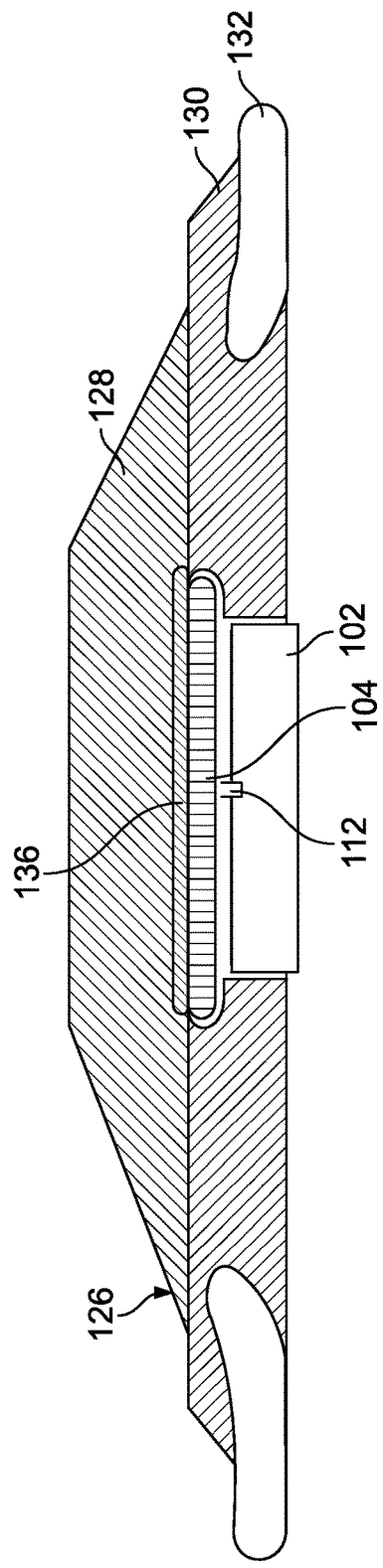
Fig. 21
Fig. 22

ELECTRICAL CONNECTOR FOR END TO END CONNECTION

CROSS-REFERENCE TO RELATED APPLICATIONS

This application claims the benefit of the filing date under 35, U.S.C. §119, (a)-(d) of European Patent 14 186 132.8, filed Sep. 24, 2014.

FIELD OF THE INVENTION

The invention relates to an electrical connector and, more particularly, to an electrical connector for end to end connection of electrical conductors.

BACKGROUND

Electrical cable connectors are commonly used various electrical technologies, and in particular, in the field of high voltage energy transmission. U.S. Pat. No. 5,201,914, discloses a known electrical connector to mechanically and electrically connect two ends of cables using a tubular electrically conductive sleeve together with screws that fix the cable within the sleeve.

Furthermore, straight joints are commonly used to connect polymeric insulating cables to cover the electric connection of the joint with electrically insulating elastic sleeves and include a Faraday cage like screening. One known method to mount an elastic covering sleeve over the connector area is to pre-expand a silicone rubber body using a known spiral holdout system. By destroying the spiral, the pre-expanded silicone material returns to a shrunken state, where it is in direct mechanical contact with the cable and the cable connector. Alternatively, heat shrinkable material can be used as a holdout, and is described in WO 2014/095563, A1. Finally, an elastic sleeve can also be assembled by sliding over the connector and using lubricating grease, for instance silicone grease, in order to reduce friction sufficiently for the assembly.

This known assembly method has the advantage that it neither uses an additional spiral, which causes a lot of waste, nor needs the presence of a heat source. However, for successfully mounting the sleeve over the electrical connector in a slide on technique, it is essential that the electrical connector have an absolutely smooth outer surface and a smooth inner surface of the elastic sleeve. Even small openings might lead to an interruption of the grease film and therefore disturb the mounting process.

SUMMARY

The object underlying the invention, among others, is to provide an improved electrical connector for end-to-end connections, which can be mounted and sealed in a particularly easy and secure manner.

Accordingly, an electrical connector is provided and includes a cover member and a connector bushing. The connector bushing is partially encased and movable in the cover member and having an electrical conductor section.

BRIEF DESCRIPTION OF THE DRAWINGS

An embodiment of the connector 1 of the invention will be described with reference to the accompanying drawings.

FIG. 4-1 is a perspective view of the connector bushing;

FIG. 4-2 is another perspective view of the connector bushing of FIG. 41;

FIG. 4-3 is yet another perspective view of the connector bushing of FIG. 41;

FIG. 4-4 is yet another perspective view of the connector bushing of FIG. 41

FIG. 15 is a sectional view of the first half shell of FIG. 12;

FIG. 16 is a side view of the first half shell of FIG. 12;

FIG. 17 is a front view of the second half shell of FIG. 13;

FIG. 18 is a side view of the second half shell of FIG. 13;

FIG. 21 is a sectional view of another electrical connector according to the invention; and FIG. 22 is a sectional view of another electrical connector according to the invention.

DETAILED DESCRIPTION OF THE EMBODIMENT(S)

The invention will now be described in more detail with reference to the figures.

Figure 1:
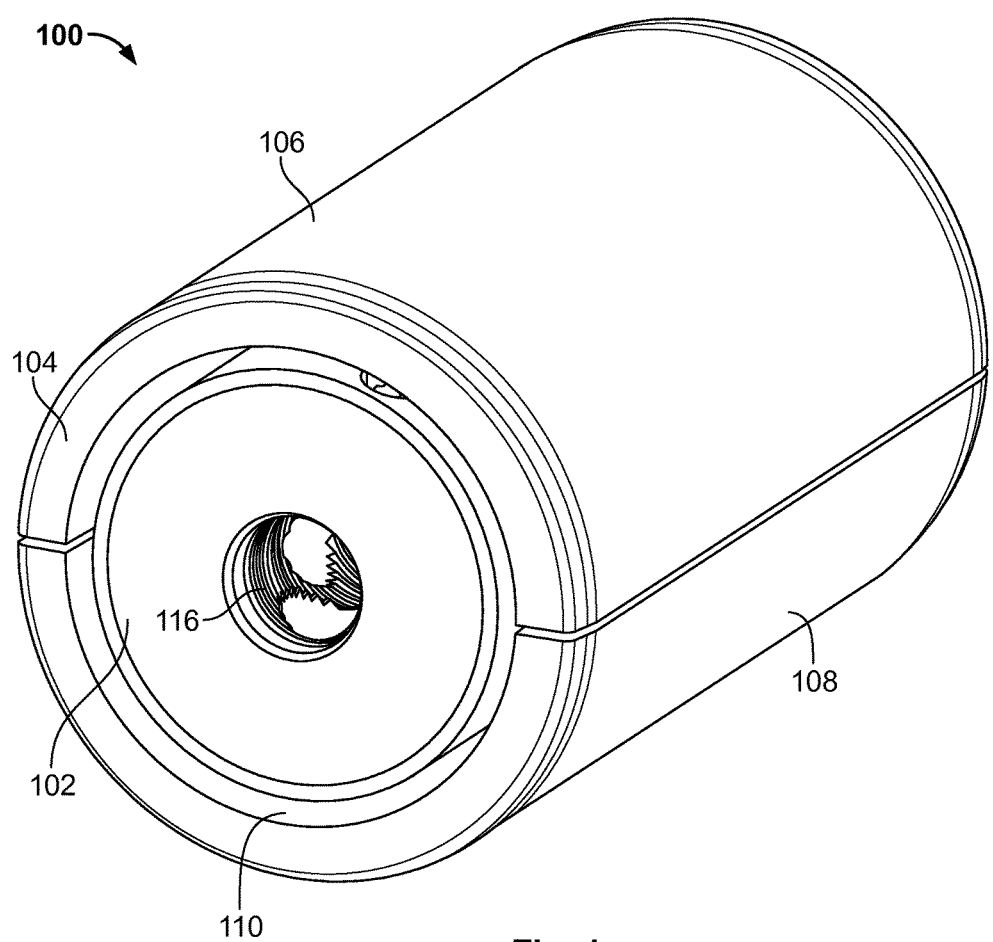
FIG. 1 is a perspective view of an electrical connector according to the invention.

With respect to FIG. 1, an electrical connector 100 according to the invention is shown. In the exemplary embodiments, the electrical connector 100 is designed for an end to end connection of electrical conductors and, in particular, for conductors that carry current load. It has to be noted that in the drawings the respective cables are not shown for the sake of clarity.

According to the invention, the electrical connector 100 includes two major component modules: an electrically conductive connector bushing 102 and a cover member 104. The connector bushing 102 is the component that is in direct mechanical and electrical contact with both electrical conductors and establishes both the mechanical attachment and the electrical contact between the two conductors. The cover member 104 forms the outer surface of the assembled electrical connector 100 which is presented for instance to the inner surface of a further elastic sheath covering the electrical connector. According to the invention, this outer surface is absolutely smooth and does not show any screw heads or openings into which applied lubricant could disappear.

According to the embodiment shown in FIG. 1, the cover member 104 includes a first half shell 106 and a second half shell 108. By separating the tubular cover member 104 into two half shells 106, 108, which are jointed to each other in a longitudinal direction, the assembly is significantly facilitated.

According to the invention, the outer diameter of the connector bushing 102 is sufficiently smaller than the inner diameter of the cover member 104, thus defining a clearance 110 between the connector bushing 102 and the cover member 104. Due to this additional space, the connector bushing 102 can move within the cover member 104 along parallel path along a length of the cover member 104 thereof, as well as in a tilting manner, such that a longitudinal axis of the connector bushing 102 forms an angle with a longitudinal axis of the cover member 104. As will be apparent from the following figures, movement in the longitudinal direction is essentially blocked by two bearing pins 112 that mechanically secure the connector bushing 102 within the cover member 104.

Figure 2:
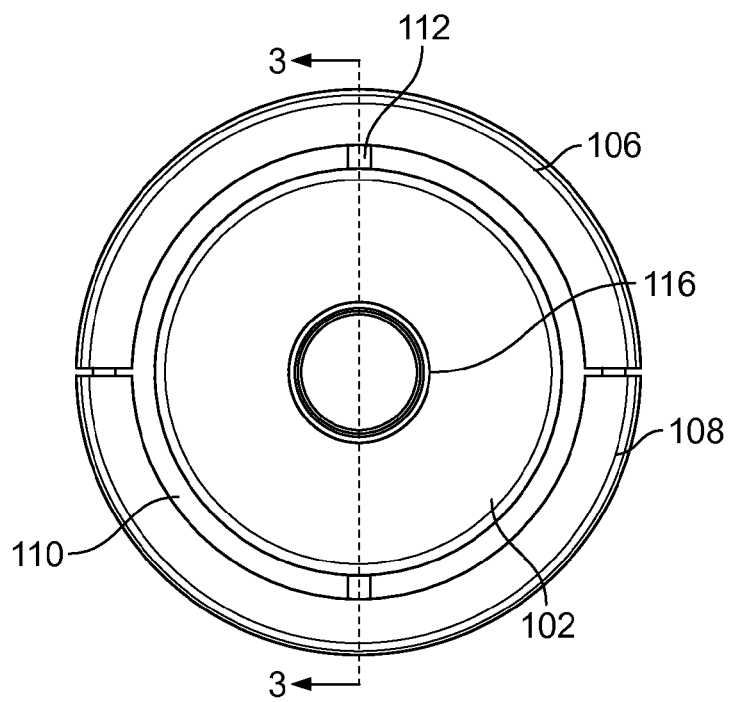
FIG. 2 is a front view of the connector of FIG. 1.

With respect to FIG. 2, two bearing pins 112 are shown and provided to support the connector bushing 102 within the cover member 104. As may be seen more clearly from the sectional view of FIG. 3, the bearing pins 112 engage with belonging receiving passageways 114 which are arranged on the outer surface of the connector bushing 102.

The connector bushing 104 includes a bore 116 that extends along its whole length for receiving the electrical conductors to be connected. According to the embodiment shown in FIG. 3, the bearing pins 112 and the bearing receiving passageways 114 are arranged in the center of the longitudinal extension and also in the center of the circumference of the each half shell 106, 108. This symmetry allows a tilting of the connector bushing 102 around an axis extending between the two pins as well as in a direction across thereto and also hybrid forms thereof. Also, parallel movement of the bearing pins 112 towards the other is possible. On the other hand, movement that would extract the connector bushing 102 from the surrounding cover member 104 is effectively deterred.

Using this degree of freedom, tolerances and eccentricities of the electrical conductors within the bore 116 can be compensated.

Figure 3:
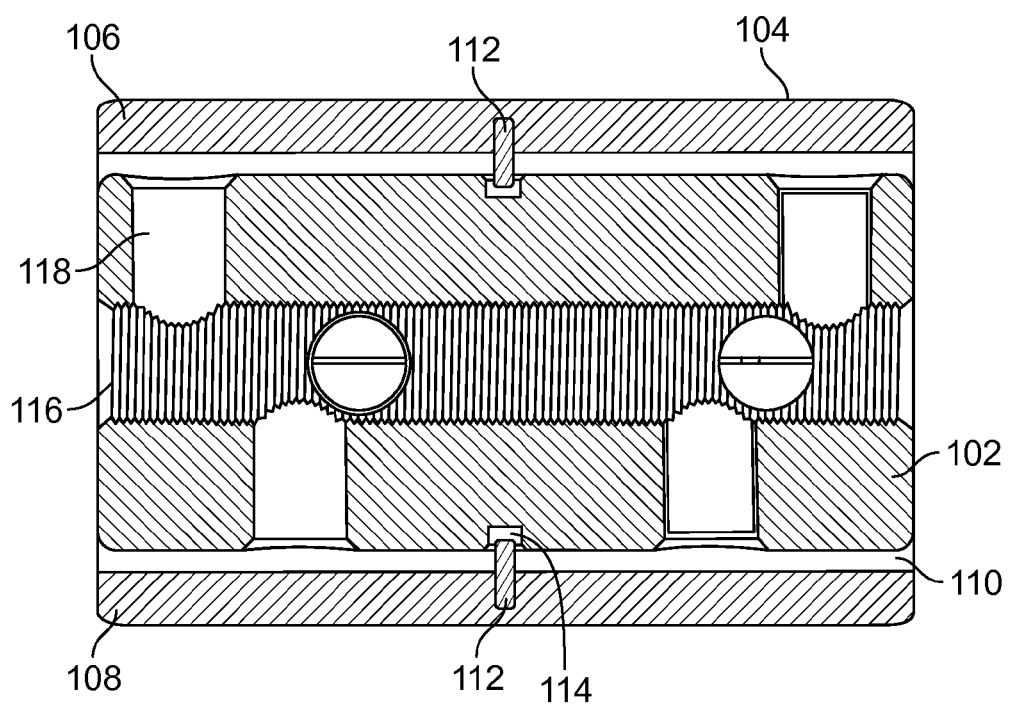
FIG. 3 is a sectional view of the connector of FIG. 2.

Furthermore, as can be seen from FIG. 3, a plurality of fastener receiving passageways 118 is provided which extend radially toward the bore 116. These fastener receiving passageways 118 serve for inserting fasteners, such as bolts or screws, which secure the electrical conductors inside the bore 116 once they are positioned in their final position. The fastener receiving passageways 118 may either be threaded for receiving a screw or have a smooth surface which is cut by a screw or receives a press fit pin. As apparent from FIG. 3, in the absence of the cover member 104, the connector bushing 102 would present at the site of the fastener receiving passageways 118 in its surface that would be detrimental when sliding an elastic sleeve 126 over the connection. Due to the invention, however, a completely smooth outer surface is provided by the outer surface of the cover member 104.

Figures 1, 4:
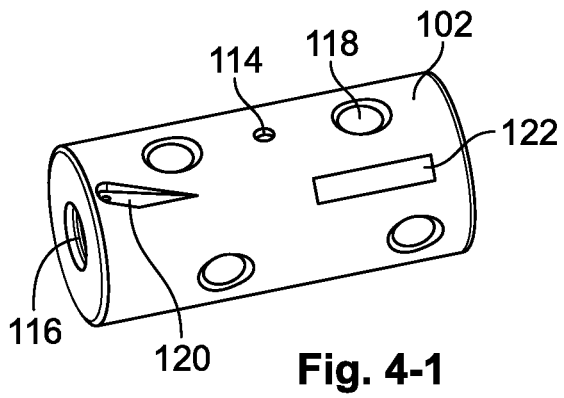
Figures 2, 4:
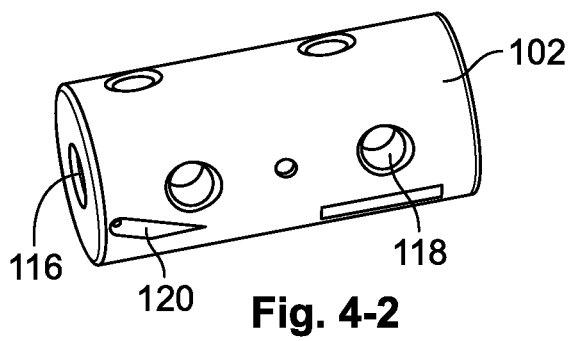
Figures 3, 4:
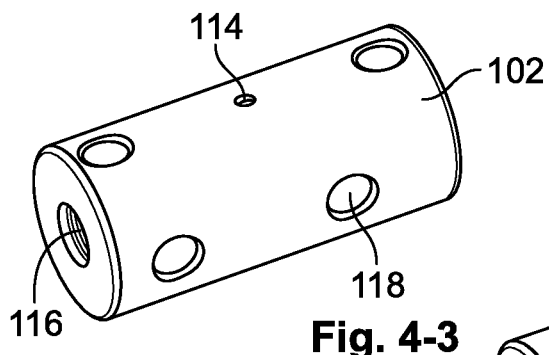
Figure 4:
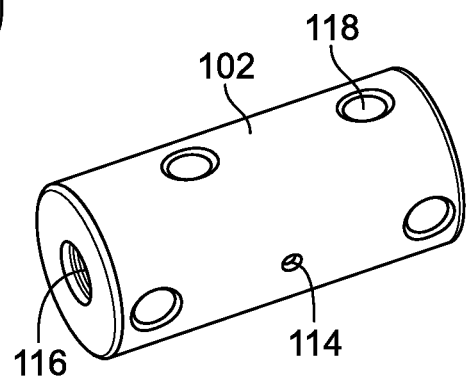

With respect to FIG. 4, the fastener receiving passageways 118 are distributed about a circumference of the connector bushing 102 in a way that symmetric pressure can be exerted on the two cable ends that are to be connected. Furthermore, as may be derived from FIG. 4-1 and FIG. 4-2, the connector bushing 102 is provided with a connection plane 120 where to a conductive lead (not shown in the figure) can be screwed. This conductive lead is fixed with its other end to the inner surface of the cover member 104 as will be apparent from the following figures. This electrically conductive lead provides a well-defined electrical contact between the connector bushing 102 and the cover member 104.

Instead of the lead, a spring contact can be used as electrical contacting mechanism.

Furthermore, two radially opposing bearing receiving passageways 114 are provided about an approximate middle of the connector bushing 102. It should be noted, that instead of the circular recesses shown in FIG. 4, elongated notches or grooves can be used and even one notch extending around the complete circumference of the connector bushing 102 can be provided. As already mentioned above, instead of the bearing receiving passageway 114, the bearing pins 112 could be arranged on the outside of the connector bushing 102 with the bearing receiving passageways 114 being arranged on the inside of the cover member 104. Finally, any necessary marking or identification text can be inscribed in the marking area 122.

Figure 5:
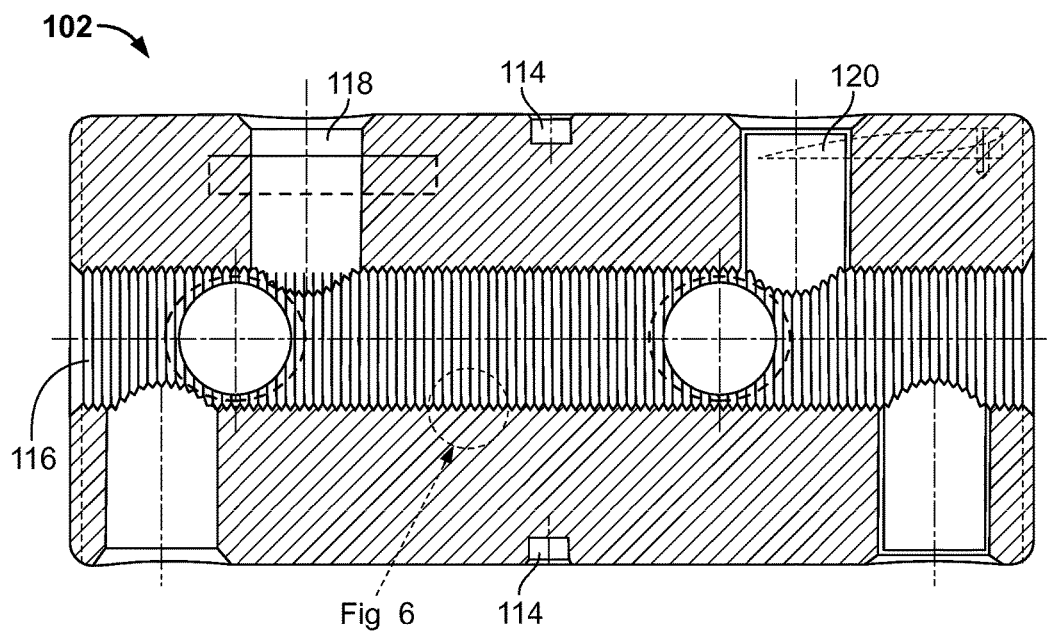
FIG. 5 is a section view of the connector bushing of FIG. 41 taken along a length thereof.
Figure 6:
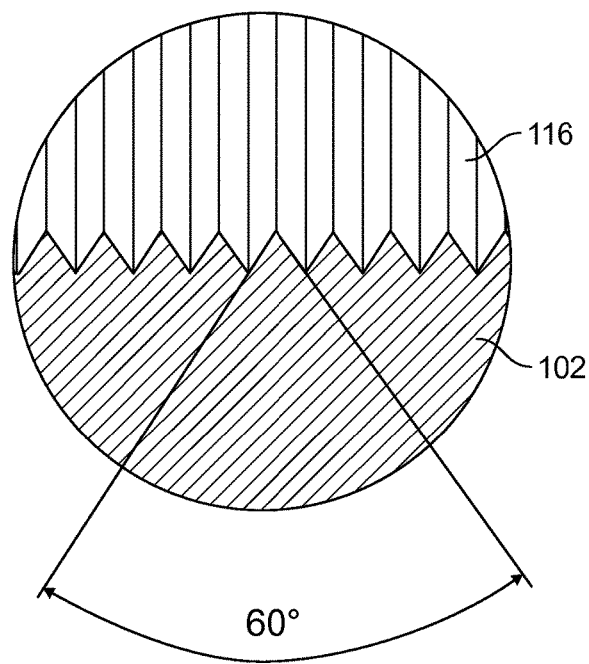
FIG. 6 is a close-up of the connector bushing of FIG. 5.
Figure 7:
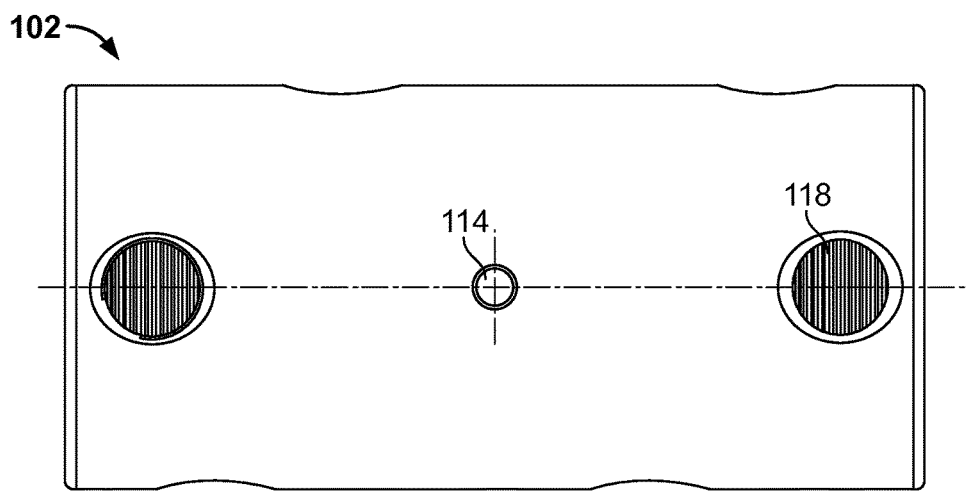
FIG. 7 is a side view of the connector bushing of FIG. 4.
Figure 8:
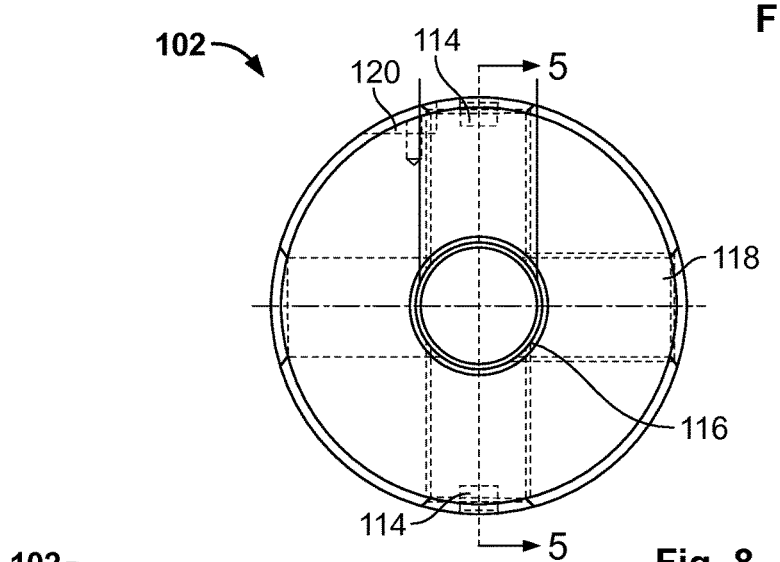
FIG. 8 is a front view of the connector bushing of FIG. 4.
Figure 9:
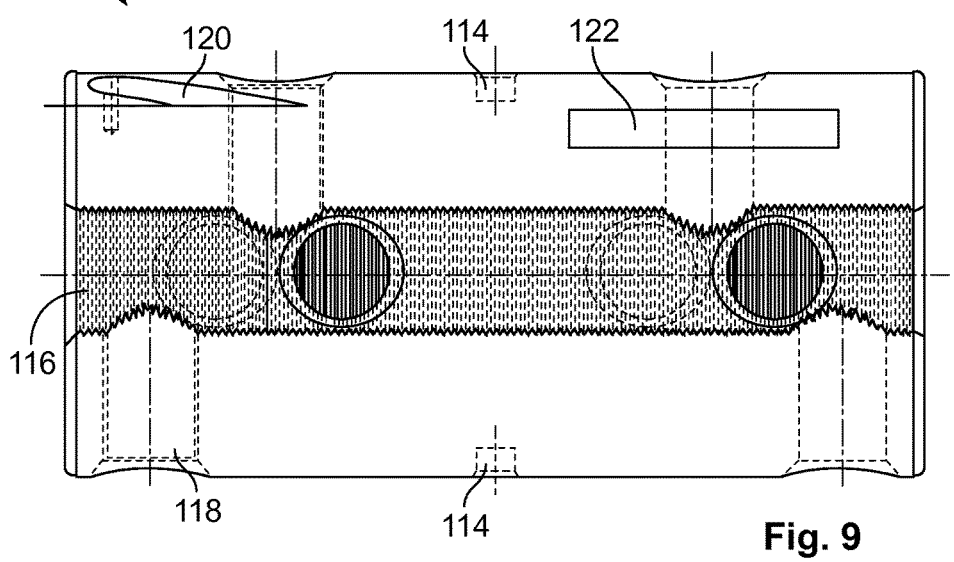
FIG. 9 is another side view of the connector bushing of FIG. 4.
Figure 10:
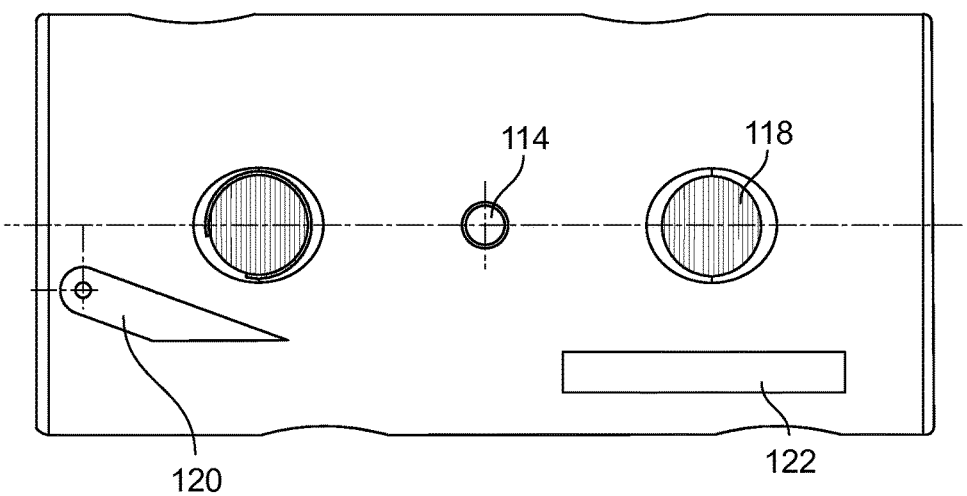
FIG. 10 is yet another side view of the connector bushing of FIG. 4.
Figure 11:
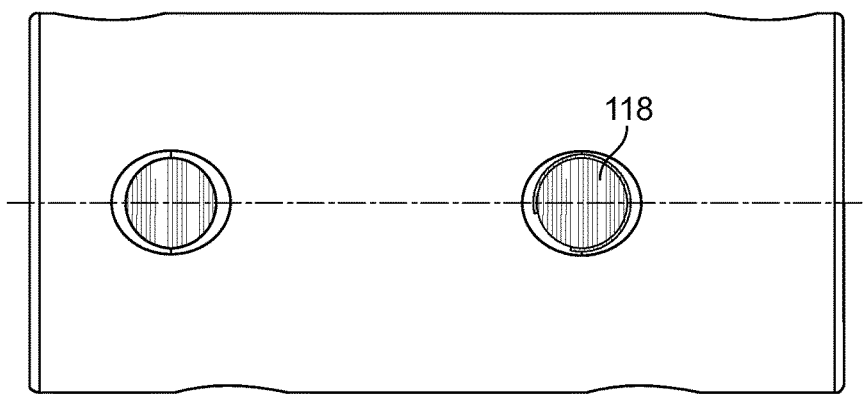
FIG. 11 is still another side view of the connector bushing of FIG. 4.
Figure 12:
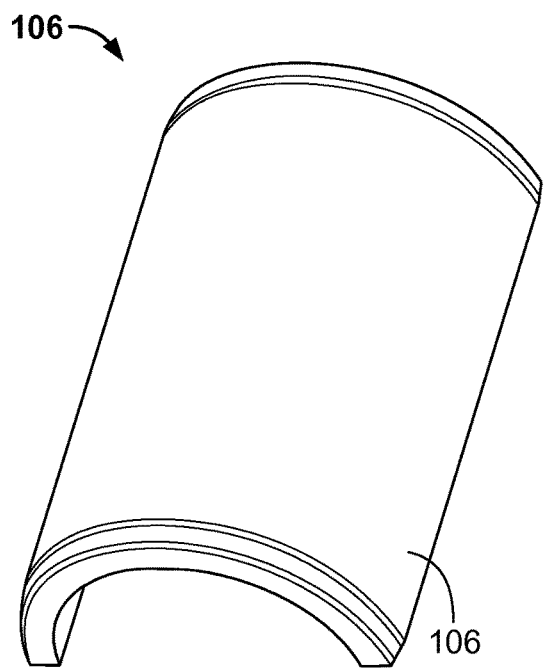
FIG. 12 is a perspective view of a first half shell of the electrical connector according to the invention.
Figure 13:
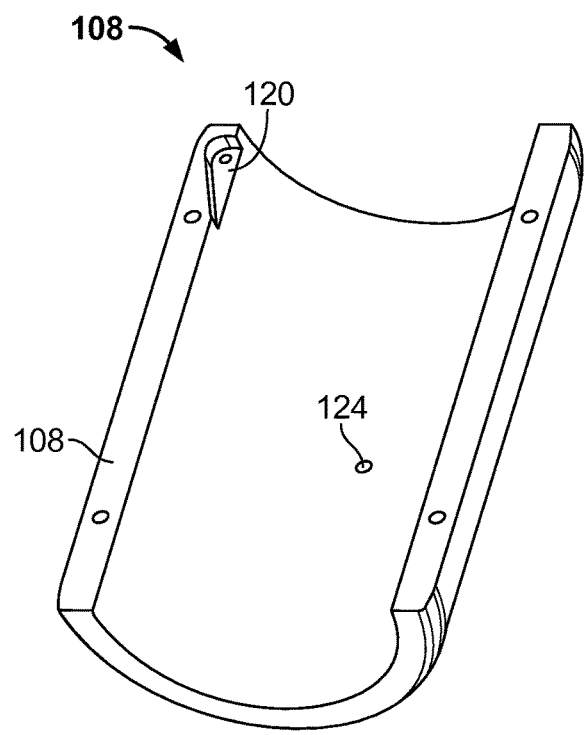
FIG. 13 is a perspective view of a second half shell of the electrical connector according to the invention.
Figure 14:
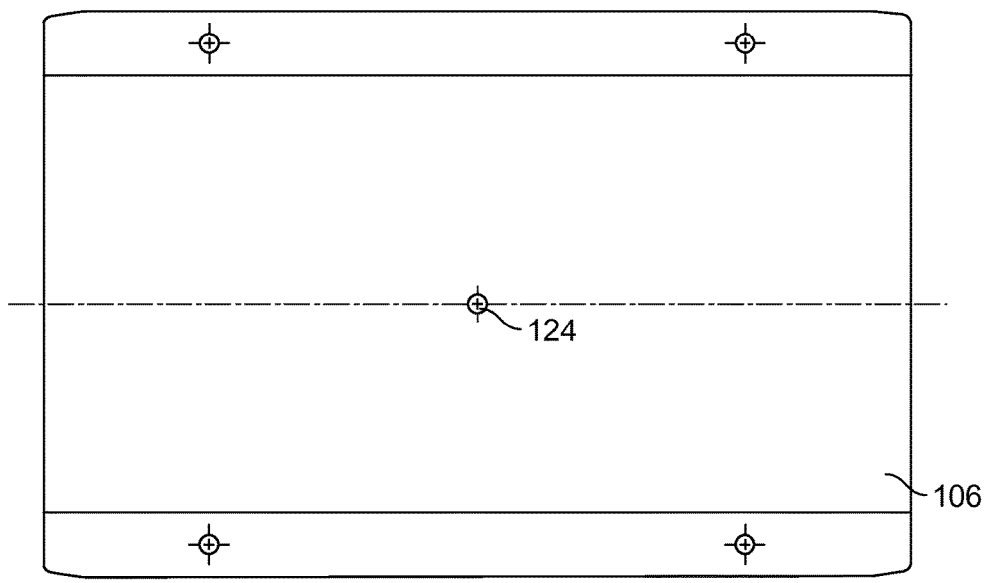
FIG. 14 is a top view of the first half shell of FIG. 12.
Figure 19:
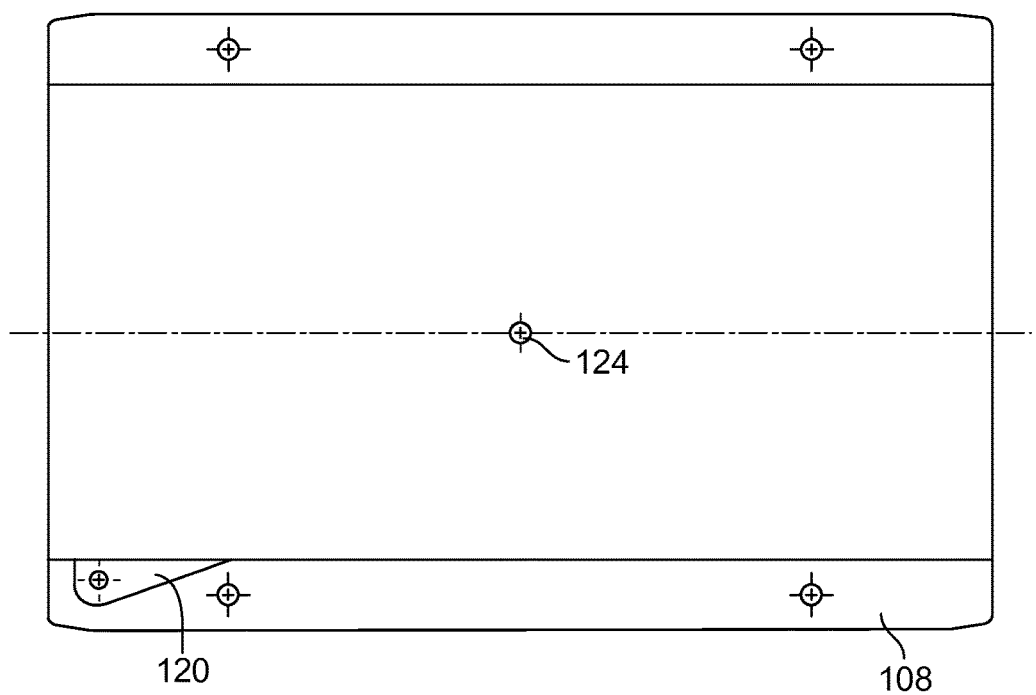
FIG. 19 is a top view of the second half shell of FIG. 13.

As shown in FIGS. 5 and 6, the inner structure of the bore 116 will be described. In order to provide a roughened surface which enhances the contact surface towards the conductors to be connected and furthermore provides storage for a lubricant, the inner surface of the bore 116 is structured by a zigzag shaped profile with 60, degree angles, as shown in FIG. 6. Instead of this structure, of course also a threading with a thread lead can be provided.

Now with reference to FIGS. 12 through 19, the first half shell 106 and the second half shell 108 are shown. The two half shells 106, 108 are connected to each other using four connection pins 123 (not visible in FIGS. 12 and 13, but shown in FIG. 20) held in respective pin receiving passageways 125 at the first and second half shells 106 and 108. Furthermore, the second half shell 108 provides another connection plane 120 to which the other end of the lead that is connected to the connector bushing 102 is screwed.

Furthermore, each half shell 106, 108 have a centrally arranged pin receiving passageway 124 for fixing the bearing pin 112 therein.

Figure 20:
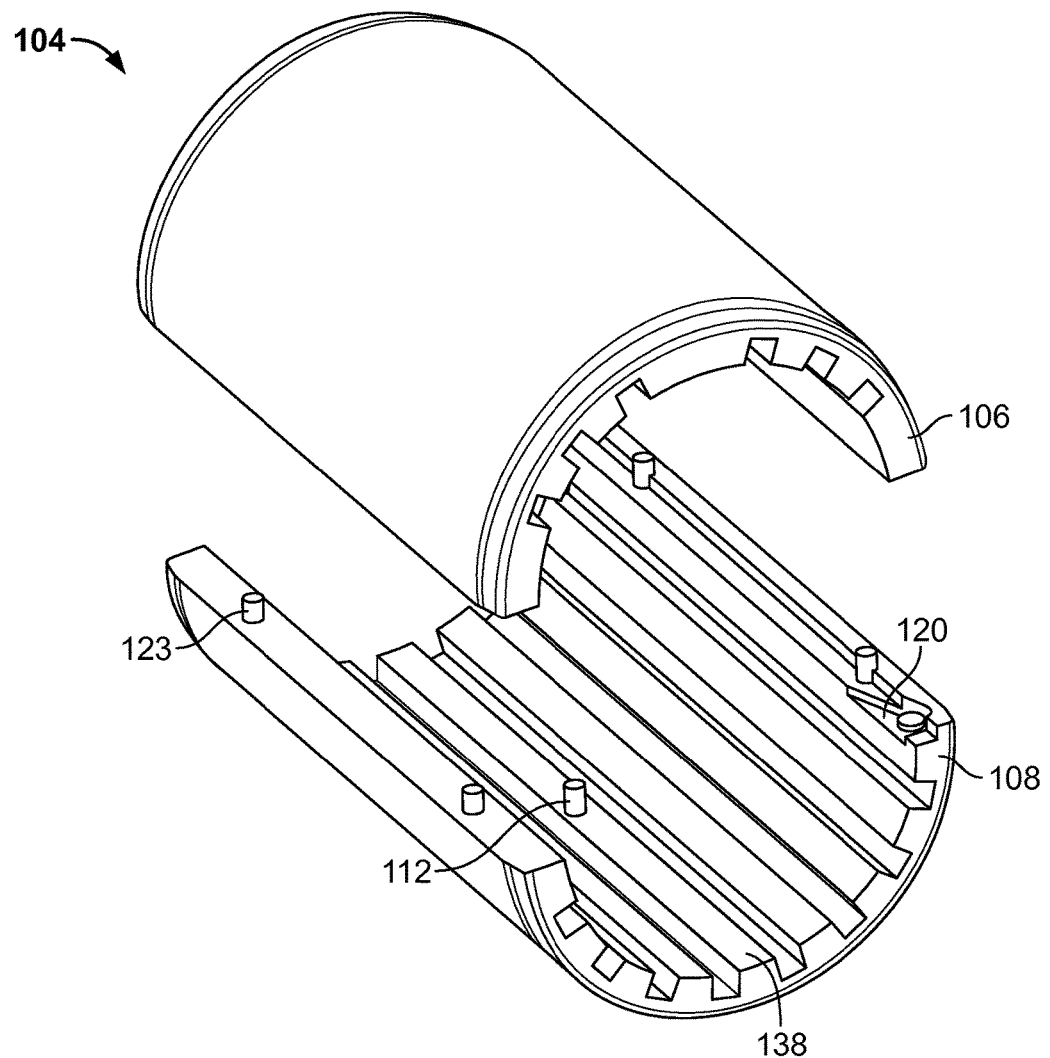
FIG. 20 is a perspective view of a cover member according to another electrical connector according to the invention.

With respect to FIG. 20, the cover member 104 according to the invention will be described. According to the shown embodiment, the inner surface of each of the first and second half shells 106, 108 is structured to include longitudinal rib shaped protrusions 138. The rib shaped protrusions 138 enhance the area of the inner surface of the cover member 104 so that a better heat dissipation to the outside of the connection can be achieved. For a person skilled in the art it is apparent that other cross sectional structures that enhance the heat dissipating surface area can of course also be chosen.

As shown in FIG. 21, the electrical connector 100 according to the invention in a fully assembled is covered with an elastic sleeve 126. The elastic sleeve 126 has a main body 128 which covers a so-called adaptor 130. The adapter part of the elastic sleeve 126 includes deflector elements 132 which are in contact with the outer sheath of the cables to be connected. Furthermore, ring deflectors 134 are arranged close to the cover member 104. The complete outside surface of the connector bushing 102 and the cover member 104 is surrounded by a Faraday cage 136 provided in the main body 128. By providing an absolutely smooth surface on the outside of the cover member 104 any damaging of the elastic sleeve 126 during assembly can be avoided and, furthermore, no irregularities which lead to electrical field peaks are present.

An alternative embodiment of the electrical connector 100 is shown in FIG. 22. Here the cover member 104 is formed to be longer than the connector bushing 102. Therefore, the ring deflectors 134 are no longer necessary. All other components correspond to those explained with respect to the previous figures.

Further improvements of the electrical connector 100 according to the invention may be envisaged. For instance, as already mentioned, the cover member 104 may be provided with grooves on its inside to provide a better thermal performance between the connector bushing 102 and the cover member 104. Furthermore, the first and second half shells 106 and 108 of the cover member 104 may additionally be closed and locked by using a latching spring inside the pins that connect the two half shells 106, 108 to each other.

In the following, the assembly of the electrical connector 100 according to the invention will be described in detail referring to all the FIGS. 1 to 22.

In a first step, the connector bushing 102 is provided. It is fabricated for instance from aluminum. The conductors which are to be connected are stripped from any insulating material covering their electrical conductive cores and are inserted from both sides into the bore 116. Essentially, the cables are inserted until they meet in the middle of the connector bushing 102. In a next step, screw bolts are inserted and tightened until the screw heads are sheared off.

Further, the first and second half shells 106, 108 of the cover member 104 are fabricated, for instance also from an electrically conductive material such as aluminum. Both of the half shells 106, 108 are provided with one bearing pin 112 each.

Now, the second half shell 108 is positioned to receive the connector bushing 102 in a way that the bearing pin 112 corresponds with the bearing receiving passageway 114. In this position both connection planes 120 are accessible and an electric lead is screwed with one end to the second half shell 108 and with its other end to the connector bushing 102.

In a next step, the first half shell 106 of the cover member 104 is mounted in a way that its connection pins 123 engage with the pin receiving passageways 125 provided at the second half shell 108. The two half shells 106, 108 are firstly secured to each other by a press fit of the fixing pins and secondly are held together by sliding an elastic sleeve 126 over the electrically conductive parts of the electrical connector 100.

According to the invention, the outer surface of the cover members is absolutely smooth and thereby a facilitated assembly of the elastic sleeve 126 can be achieved. The electrically conductive connector bushing 102, on the other hand, stays movable to a certain extent, thereby compensating an off centered position of the electrical conductors with respect to the surrounding elastic sleeve 126.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An electrical connector, comprising:
a cover member having a smooth outer surface; and
a connector bushing partially encased and movable in the cover member and having an electrical conductor section, the cover member supported on the connector bushing using a bearing pin that corresponds to a bearing receiving passageway.

2. An electrical connector according to claim 1, wherein the cover member is tubular.

3. An electrical connector according to claim 1, wherein the cover member includes a pair of shells that engage each other.

4. An electrical connector according to claim 1, wherein the bearing pin is disposed on an inner surface of the cover member.

5. An electrical connector according to claim 4, wherein the bearing receiving passageway includes a circular cavity or an elongated groove.

6. An electrical connector according to claim 1, wherein the connector bushing includes an inner surface having a roughened structure.

7. An electrical connector according to claim 6, wherein the roughened structure includes a plurality of circumferential incisions forming a zigzag shape along a length of the inner surface.

8. An electrical connector according to claim 1, wherein the connector bushing includes a threaded fastener receiving passageway.

9. An electrical connector according to claim 1, further comprising a protrusion disposed on an inner surface of the cover member.

10. An electrical connector according to claim 9, wherein the protrusion includes a plurality of ribs.

11. An electrical connector according to claim 1, wherein distal ends of the connector bushing and the cover member are flush to each other.

12. An electrical connector according to claim 1, further comprising a tubular sleeve covering the cover member and having an insulating layer and a conductive layer embedded in the insulating layer.

13. An electrical connector according to claim 12, wherein the conductive layer includes a ring shaped Faraday cage surrounding the cover member.

14. An electrical connector according to claim 13, wherein the conductive layer includes a ring deflector positioned adjacent to a distal end of the cover member.

15. An electrical connector according to claim 1, wherein a clearance is formed between the connector bushing and the cover member.

* * * * *